United States Patent [19]
Yamada et al.

[11] Patent Number: 5,140,576
[45] Date of Patent: Aug. 18, 1992

[54] METHOD OF AND APPARATUS FOR SETTING FOCUSING CONTROL INTO OPERATION

[75] Inventors: Shinichi Yamada, Hirakata; Mitsuro Moriya, Ikoma; Masayuki Shibano, Izumisano; Hiroyuki Yamaguchi, Hirakata, all of Japan

[73] Assignee: Matsushita Electric Industrial Co., Ltd., Osaka, Japan

[21] Appl. No.: 611,097

[22] Filed: Nov. 8, 1990

[30] Foreign Application Priority Data

| Nov. 10, 1989 | [JP] | Japan | 1-293501 |
| Jan. 11, 1990 | [JP] | Japan | 2-004135 |
| May 23, 1990 | [JP] | Japan | 2-133385 |

[51] Int. Cl.$^5$ .............................. G11B 7/00
[52] U.S. Cl. .................. 369/44.35; 369/44.25; 369/44.29; 369/44.11
[58] Field of Search ............ 369/44.11, 44.24–44.36, 369/124, 32, 57, 106; 250/201.5, 201.2; 358/342

[56] References Cited

U.S. PATENT DOCUMENTS

| 4,541,084 | 9/1985 | Oku et al. | 369/44.25 |
| 4,651,314 | 3/1987 | Yoshikawa et al. | 369/44.29 |
| 4,733,066 | 3/1988 | Konno et al. | 369/44.25 |

FOREIGN PATENT DOCUMENTS

| 0007523 | 1/1988 | Japan | 369/44.25 |
| 0142527 | 6/1988 | Japan | 369/44.35 |
| 0089027 | 4/1989 | Japan | 369/44.27 |

Primary Examiner—Roy N. Envall, Jr.
Assistant Examiner—Thang V. Tran
Attorney, Agent, or Firm—Wenderoth, Lind & Ponack

[57] ABSTRACT

A method of and an apparatus for setting into operation a focusing control for bringing a focal point of a beam onto a recording surface of an optical disk such that the beam reproduces signals from the recording surface, in which a relative velocity between the focal point and the recording surface is detected on the basis of an output of a focusing error detection device for detecting a gap between the focal point and the recording surface and velocity of a displacement device for driving the focal point in a direction perpendicular to the recording surface is controlled on the basis of the detected relative velocity such that focusing control can be stably set into operation by starting focusing control after controlling the relative velocity.

21 Claims, 7 Drawing Sheets

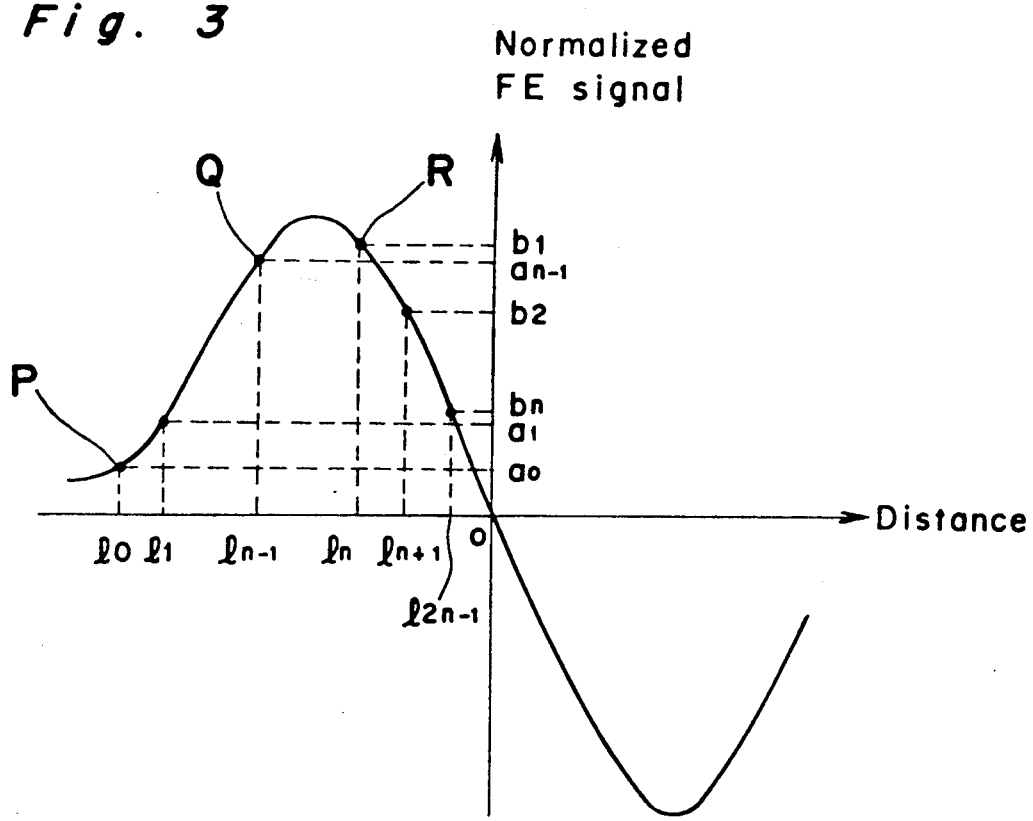

METHOD OF AND APPARATUS FOR SETTING FOCUSING CONTROL INTO OPERATION

BACKGROUND OF THE INVENTION

The present invention relates to a method of and an apparatus for setting focusing control into operation in a focusing control loop for bringing a focal point of a beam onto a recording surface of an optical disk by driving an objective lens of an optical disk apparatus.

As an apparatus for performing focusing control, an optical reproducing apparatus is known from, for example, Japanese Patent Laid-Open Publication No. 64-89027 in which a beam emitted from a light source such as a semiconductor laser diode is irradiated, through convergence, onto an optical disk rotating at a predetermined number of revolutions such that signals recorded on the optical disk are reproduced. In this known apparatus, focusing control is performed such that a focal point of the beam is at all times located on a recording surface of the optical disk when signals recorded on the recording surface of the optical disk are reproduced, while reflected light from the recording surface is received by a photodetector. A focusing error signal for performing focusing control for bringing the focal point of the beam onto the recording surface at all times is also detected from reflected light from the recording surface. In order to perform focusing control, this focusing error signal is fed back to a focusing actuator for displacing the beam substantially perpendicularly to the recording surface.

Meanwhile, in general focusing error detecting methods of detecting a distance between the focal point of the beam and the recording surface, its detection range is about 10 plus several $\mu$m. Therefore, in the case where focusing control is performed, the focusing actuator should be driven preliminarily so as to bring the focal point of the beam within the detection range of the focusing error.

Furthermore, several conditions are required to be satisfied for securing that focusing control is in operation. The most important condition is a relative velocity between the focal point and the recording surface at the time when the focusing control loop is closed. This relative velocity is restricted by the detection range of the focusing error, a gain of the focusing control loop, etc. When the relative velocity exceeds a certain value, the relative velocity falls out of the detection range of the focusing error due to transient response, so that it becomes impossible to set focusing control into operation. Therefore, the focusing actuator is required to be driven gradually such that the relative velocity at the time of closing of the focusing control loop does not exceed a limit velocity.

However, in the known apparatus, the focusing actuator is driven by open loop control. Thus, when a drive signal is lower than a certain level, the focusing actuator is not driven by influences such as wear, etc. Meanwhile, when the drive signal exceeds the certain level, the drive of the focusing actuator is started abruptly. Hence, a velocity at the time when the focal point coincides with the recording surface exceeds the set relative velocity and thus, it frequently becomes impossible to set the focusing control into operation.

SUMMARY OF THE INVENTION

Accordingly, an essential object of the present invention is to provide a method of and an apparatus for setting the focusing control into operation in which even in the case where a relative velocity between a focal point of a beam and a recording surface of an optical disk is raised due to wear, etc., the focusing control can be stably set into operation.

In order to accomplish this object of the present invention, there is provided an apparatus for setting into operation a focusing control for bringing a focal point of a beam onto a recording surface of an optical disk such that the beam reproduces signals from the recording surface, in which a relative velocity between the focal point and the recording surface is detected from an output of a focusing error detection means for detecting a gap between the focal point and the recording surface and in which the velocity of a displacement means for driving the focal point in a direction perpendicular to the recording surface is controlled on the basis of the detected relative velocity such that a focusing control loop is closed.

By the above described arrangement, since the velocity of the displacement means is controlled on the basis of the output of the relative velocity detection means such that the relative velocity is reduced, influences such as wear of the focusing actuator, etc. can be lessened and the transient response of the focusing control loop at the time when the focusing control loop has been closed is improved.

BRIEF DESCRIPTION OF THE DRAWINGS

The objects and features of the present invention will become apparent from the following description taken in conjunction with the preferred embodiments thereof with reference to the accompanying drawings, in which:

FIG. 3 is a graph showing a relation between a normalized focusing error signal and a distance between a focal point of a beam and a recording surface of an optical disk in the apparatus of FIG. 1;

FIGS. 4(a) and 4(b) are conversion tables showing relation between a normalized focusing signal and the distance of FIG. 3;

Before the description of the present invention proceeds, it is to be noted that like parts are designated by like reference numerals throughout several views of the accompanying drawings.

DETAILED DESCRIPTION OF THE INVENTION

Figure 1:
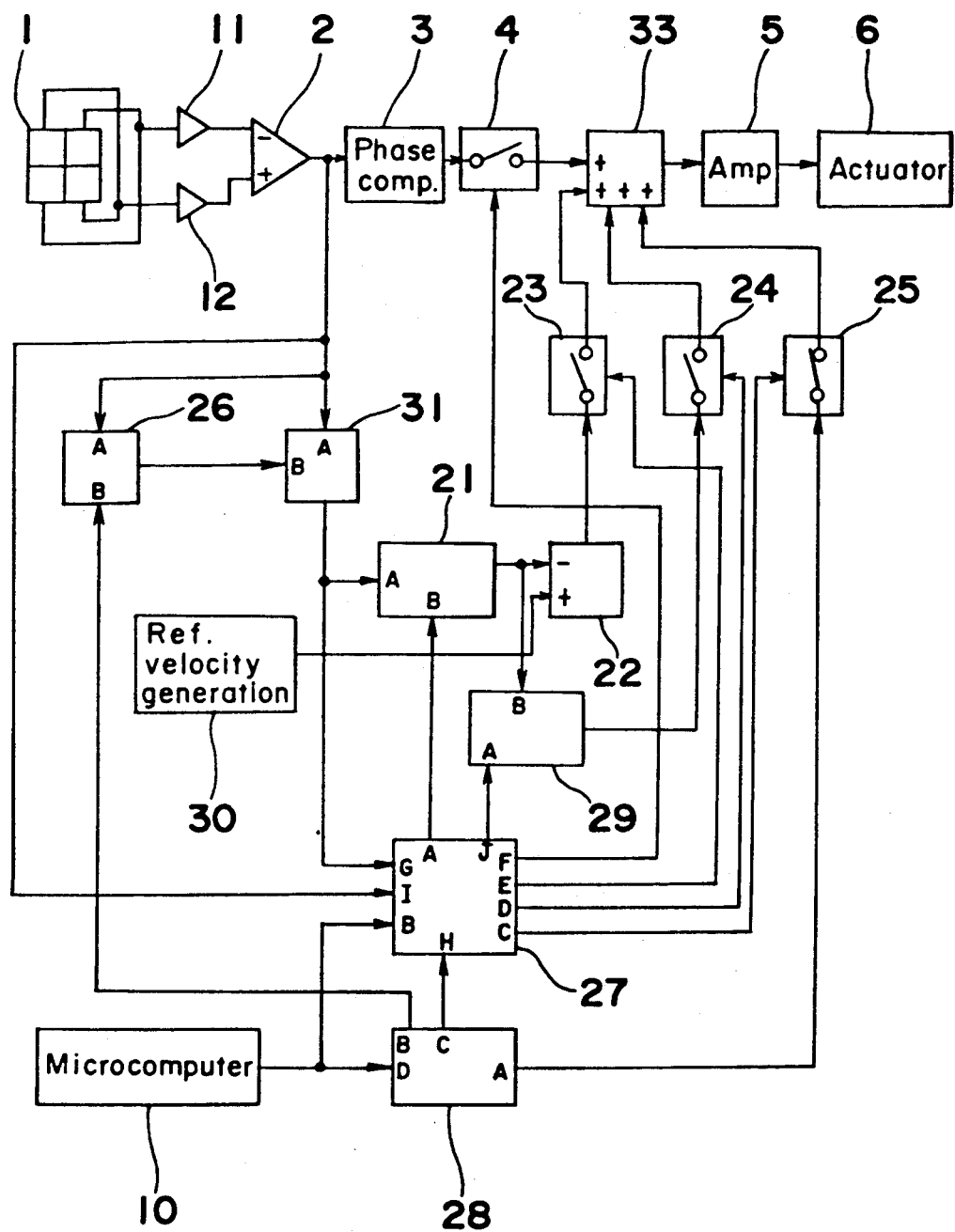
FIG. 1 is a block diagram showing an apparatus according to a first embodiment of the present invention.

Referring now to the drawings, there is shown in FIG. 1 a focusing control loop, including an apparatus for setting a focusing control into operation according to a first embodiment of the present invention. A photodetector 1 is divided into four detection regions. Current/voltage converters (hereinbelow, referred to as "I/V converters") 11 and 12 add the outputs of one pair and the other pair of the diagonal detection regions of the photodetector 1, respectively, so as to convert detection currents into voltages. A differential amplifier 2 is provided for obtaining a difference between outputs of the I/V converters 11 and 12. An optical system (not shown) and the photodetector 1 constitute a focusing error detection system which is based on the so-called astigmatic technique.

An output of the differential amplifier 2 acts as a focusing error signal (hereinbelow, referred to as an "FE signal") indicative of a gap between a focal point of a beam and a recording surface of an optical disk. The output of the differential amplifier 2 is fed to a phase compensation circuit 3 for stabilizing the focusing control loop. An output of the phase compensation circuit 3 is transmitted to an adder 33 through a switch 4 for turning on and off focusing control. The adder, 33 in turn, adds inputted signals and outputs a corresponding sum. Furthermore, an output of the adder 33 is fed, via a power amplifier 5, to a focusing actuator 6 for displacing an objective lens of an optical head. The above components comprise a loop of the focusing control loop.

The output of the differential amplifier 2 is applied to a terminal I of a changeover circuit 27, a terminal A of a multiplier 31 and a terminal A of an amplitude detection circuit 26. The multiplier 31 multiplies the input signal so as to output the product. An output of the amplitude detection circuit 26 is applied to a terminal B of the multiplier 31. The amplitude of the FE signal varies due to a difference of reflectivity of the recording surface of the optical disk. Thus, the amplitude detection circuit 26 detects a factor for the correcting amplitude of the FE signal to that of normal reflectivity from the FE signal inputted to the terminal A of the amplitude detection circuit 26 at the time when a terminal B of an arithmetic circuit 29 is at a high level so as to output the factor. Thus, an output of the multiplier 31 is the FE signal having the amplitude thereof corrected to that of normal reflectivity.

A relative velocity detection circuit 21 detects a relative velocity between the focal point and the recording surface from the normalized Fe signal and outputs the relative velocity to a subtractor 22 and a terminal B of the arithmetic circuit 20. Meanwhile, the detection of the relative velocity in the relative velocity detection circuit 21 is changed over based on a level of a terminal A of the changeover circuit 27. The subtractor 22 subtracts an output of the relative velocity detection circuit 21 from an output of a reference velocity generation circuit 30 and outputs the difference to a switch 23. When a terminal A of the arithmetic circuit 29 has become a high level, the arithmetic circuit 29 performs arithmetic operations based on the relative velocity inputted to the terminal B of the arithmetic circuit 29 immediately before the terminal A of the arithmetic circuit 29 becomes the high level and outputs the arithmetic result to a switch 24. When a high-level signal for setting the focusing control into operation has been applied to a terminal B of the changeover circuit 27 from a microcomputer 10, terminals D, E and F of the changeover circuit 27 are set to a low level so as to open the switches 24, 23 and 4, and a terminal C of the changeover circuit 27 is set to a high level so as to close a switch 25. Meanwhile, when a high-level signal has been inputted to a terminal H of the changeover circuit 27, any one of the terminals D, E and F of the changeover circuit 27 is changed over to a high level in accordance with the FE signal inputted to the terminal I of the changeover circuit 27 or the normalized FE signal inputted to a terminal G of the changeover circuit 27. When a high-level signal for setting the focusing control into operation has been applied to a terminal D of a signal generator 28 from the microcomputer 10, the signal generator 28 feeds from its terminal A to the switch 25 a voltage for driving the actuator 6. The adder 33 adds input signals and applies the sum to the power amplifier 5. The actuator 6 is driven in accordance with an output of the power amplifier 5.

Figure 2:
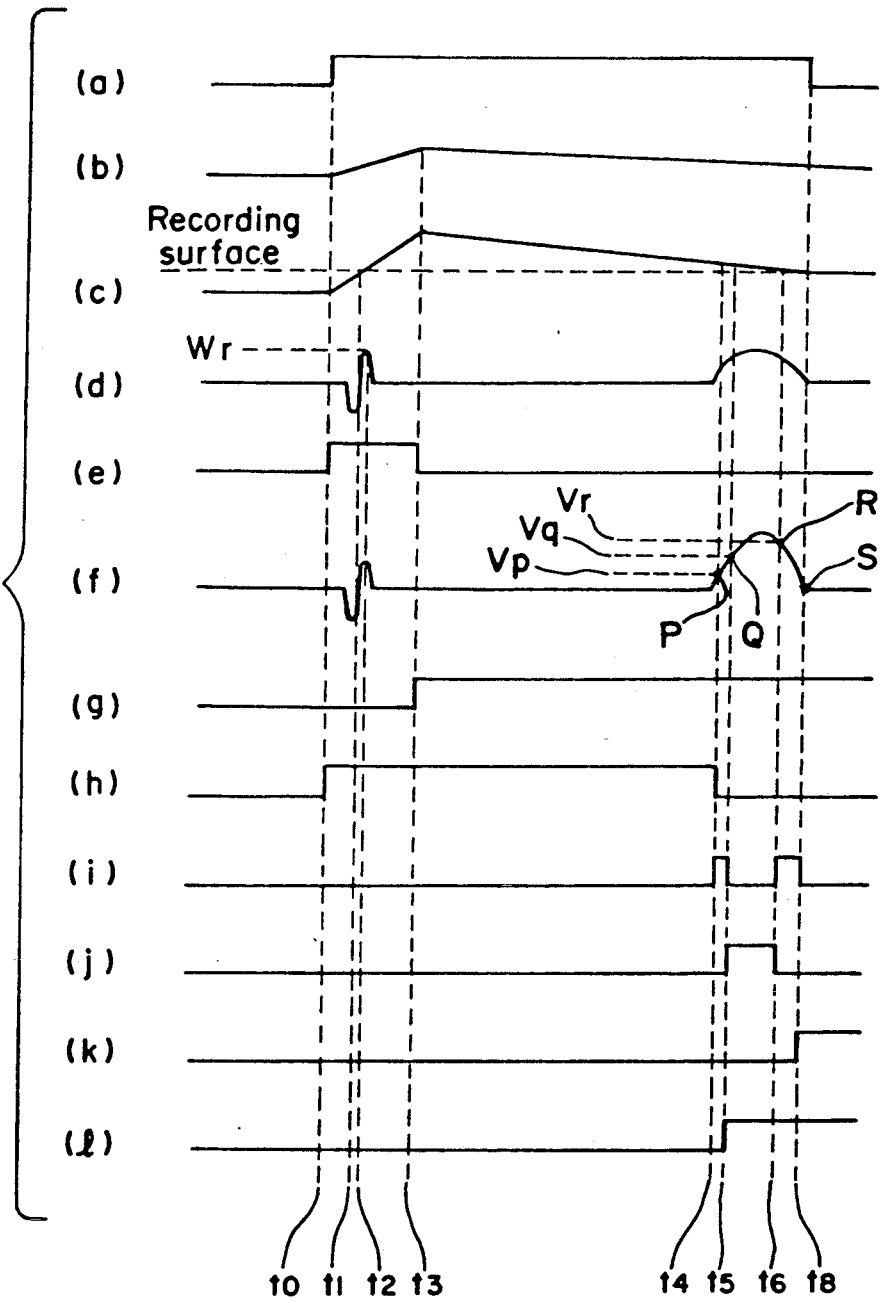
FIGS. 2(a) to 2(l) are timing charts explanatory of operation of the apparatus of FIG. 1.

Hereinbelow, the operation of the focusing control loop up to its closing is described with reference to the timing charts of FIGS. 2(a) to 2(l). FIG. 2(a) shows a waveform of the output of the microcomputer 10 and FIG. 2(b) shows a waveform of the output of the terminal A of the signal generator 28. FIG. 2(c) shows of the focal point location of the beam relative to the recording surface and FIG. 2(d) shows a waveform of the FE signal. FIG. 2(e) shows a waveform of the output of the terminal B of the signal generator 28 and FIG. 2(f) shows a waveform of the output of the multiplier 31. Meanwhile, FIG. 2(g) shows a waveform form of the output of the terminal C of the signal generator 28 and FIG. 2(h) shows a waveform of the output of the terminal C of the changeover circuit 27. FIG. 2(i) shows a waveform of the output of the terminal E of the changeover circuit 27 and FIG. 2(j) shows a waveform of the output of the terminal D of the changeover circuit 27. Furthermore, FIG. 2(k) shows a waveform of the output of the terminal F of the changeover circuit 27 and FIG. 2(l) shows waveform of the output of the terminal A of the changeover circuit 27.

When the signal for setting the focusing control into operation has become a high level at time to of FIG. 2(a), a changeover circuit 27 sets its terminal C to the high level as shown in FIG. 2(h) so as to close the switch 25. As shown in FIG. 2(e), a signal indicative of a period for detecting the normalization factor is outputted from the terminal B of the signal generator 28. Meanwhile, the signal generator 28 outputs from its terminal A the voltage shown in FIG. 2(b). The actuator 6 is driven in accordance with the output of the terminal A of the signal generator 28 so as to bring the objective lens closer to the recording surface. Thus, the focal point of the beam is displaced as shown in FIG. 2(c) and coincides with the recording surface at time t1. The focal point of the beam is further displaced and the FE signal assumes a maximum Wr at time t2 as shown in FIG. 2(d). The amplitude detection circuit 26 detects the maximum Wr and outputs a ratio of a maximum Wi in the case of normal reflectivity of the recording surface to the maximum Wr, i.e. (Wi/Wr) as the normalization factor. The voltage of the terminal A of the signal generator 28 assumes a maximum at time t3 as shown in FIG. 2(b) and the maximum of the voltage of the terminal A of the signal generator 28 is set such that the focal point is spaced a sufficiently large distance from the recording surface as shown in FIG. 2(c). As shown in, FIG. 2(e), the signal generator 28 stops, at time t3, the detection of the factor performed by the amplitude detection circuit 26 and the subsequent output of the multiplier 31 becomes the normalized FE signal.

Meanwhile, as shown in FIG. 2(g), the signal generator 28 outputs a high-level signal an the terminal C thereof at time t3 so as to apply a period of changeover to the changeover circuit 27. As shown in FIG. 2(b), the voltage outputted from the terminal A of the signal generator 28 decreases gradually. In response to this gradual decrease of the voltage of the terminal A of the signal generator 28, the actuator 6 is driven so as to move the focal point towards the recording surface as shown in FIG. 2(c). When the focal point comes close to the recording surface and the normalized FE signal assumes a value Vp at a point P at time t4 as shown in FIG. 2(f), the changeover circuit 27 opens the switch 25 and closes the switch 23 as shown in FIGS. 2(h) and 2(i), respectively. Thus, velocity control is started such that the output of the relative velocity detection circuit 21 coincides with the output of the reference velocity generation circuit 30, namely the relative velocity between the focal point and the recording surface is equal to the reference velocity.

Since the reference velocity is set in a direction in which the recording surface and the focal point come close to each other, the normalized FE signal assumes a value Vq at a point Q at time t5 as shown in FIG. 2(f). As shown in FIGS. 2(i) and 2(j), the changeover circuit 27 opens the switch 23 and closes the switch 24 in response to the detection of the point Q. On the basis of the relative velocity at the point Q, the arithmetic circuit 29 calculates and outputs the voltage which gives the reference velocity at the time when the normalized FE signal assumes a value Vr. When the focal point comes close to the recording surface and the normalized FE signal assumes the value Vr at a point R at time t6, the changeover circuit 27 opens the switch 24 and closes the switch 23 as shown in FIGS. 2(j) and 2(i), respectively. Subsequently, velocity control is again started such that the relative velocity between the focal point and the recording surface becomes the reference velocity. When the FE signal crosses zero at point t8 as shown in FIG. 2(d), the changeover circuit 27 opens the switch 23 and closes the switch 4 as shown in FIGS. 2(i) and 2(k), respectively such that focusing control is in operation.

Meanwhile, since the change of level of the normalized FE signal is small due to its travel at the fixed value between the points Q and R, it becomes possible to prevent a phenomenon in which the velocity control becomes unstable due to an increase of detection error of the relative velocity. As shown in FIG. 2(l), the changeover circuit 27 exhibits a first region in which the terminal A is at low level from the point P to the point Q of the normalized FE signal and a second region in which the terminal A is at high level from the point R to the point S. The relative velocity detection circuit 21 detects the relative velocity from region signals of the first and second regions and the normalized FE signal.

Hereinbelow, the operation of the relative velocity detection circuit 21 is described. In order to convert the value of the normalized FE signal into the distance from the focal point to the recording surface, the relative velocity detection circuit 21 has a conversion formula and two kinds of conversion tables. When the region signal outputted by the changeover circuit 27 is of the first region, the first conversion table is employed so as to calculate the relative velocity by obtaining a change of distance per unit time. On the other hand, when the region signal outputted by the changeover circuit 27 is of the second region, the second conversion table or the conversion formula is employed in the same manner. Detection of the relative velocity is described with reference to FIG. 3 and FIGS. 4(a) and 4(b). FIG. 3 shows the relation between the normalized FE signal and the distance between the focal point and the recording surface. In FIG. 3 points P, Q and R represent the points P, Q and R of FIG. 2(f). Since the differential voltage of the normalized FE signal and distance between the focal point and the recording surface is determined preliminarily as shown in FIG. 3, the conversion table between the normalized FE signal and the distance between the focal point and the recording surface can be formulated in the case of the first region as shown in FIG. 4(a). Likewise, in the case of the second region, the conversion table shown in FIG. 4(b) can be formulated. Meanwhile, below a value on in the second region in FIG. 3, the normalized FE signal is substantially proportional to the distance and thus, conversion from the normalized FE signal into the distance can be performed by a simple conversion formula, Accordingly, the normalized FE signal is retrieved at a predetermined period and the distance is obtained from the first conversion table in the case of the first region and from the second conversion table or the conversion formula in the case of the second region. Then, the difference between this obtained distance and a distance obtained one period before is divided by the period so as to obtain the relative velocity.

By dividing the region into two sections, it becomes possible to accurately obtain the distance even if two value of the distance are given for one value of the normalized FE signal. Meanwhile, in the range in which the normalized FE signal below the value bn is proportional to the distance, the distance can be obtained by the simple conversion formula and thus, the memory capacity of the second conversion table can be reduced.

It is to be noted that the present invention is not restricted to the first embodiment referred to above. For example, in the first embodiment, the interval from the point Q to the point R of FIG. 2(f), during which the change of level of the normalized FE signal is small and detection error of the relative velocity is increased, is detected by the level of the normalized FE signal. However, it can also be so arranged that the ratio of change of the distance, between the recording surface and the focal point to the amount of change of the normalized FE signal is obtained such that the points Q and R are detected by detecting an interval during which the obtained ratio is lower than a predetermined value.

Figure 5:
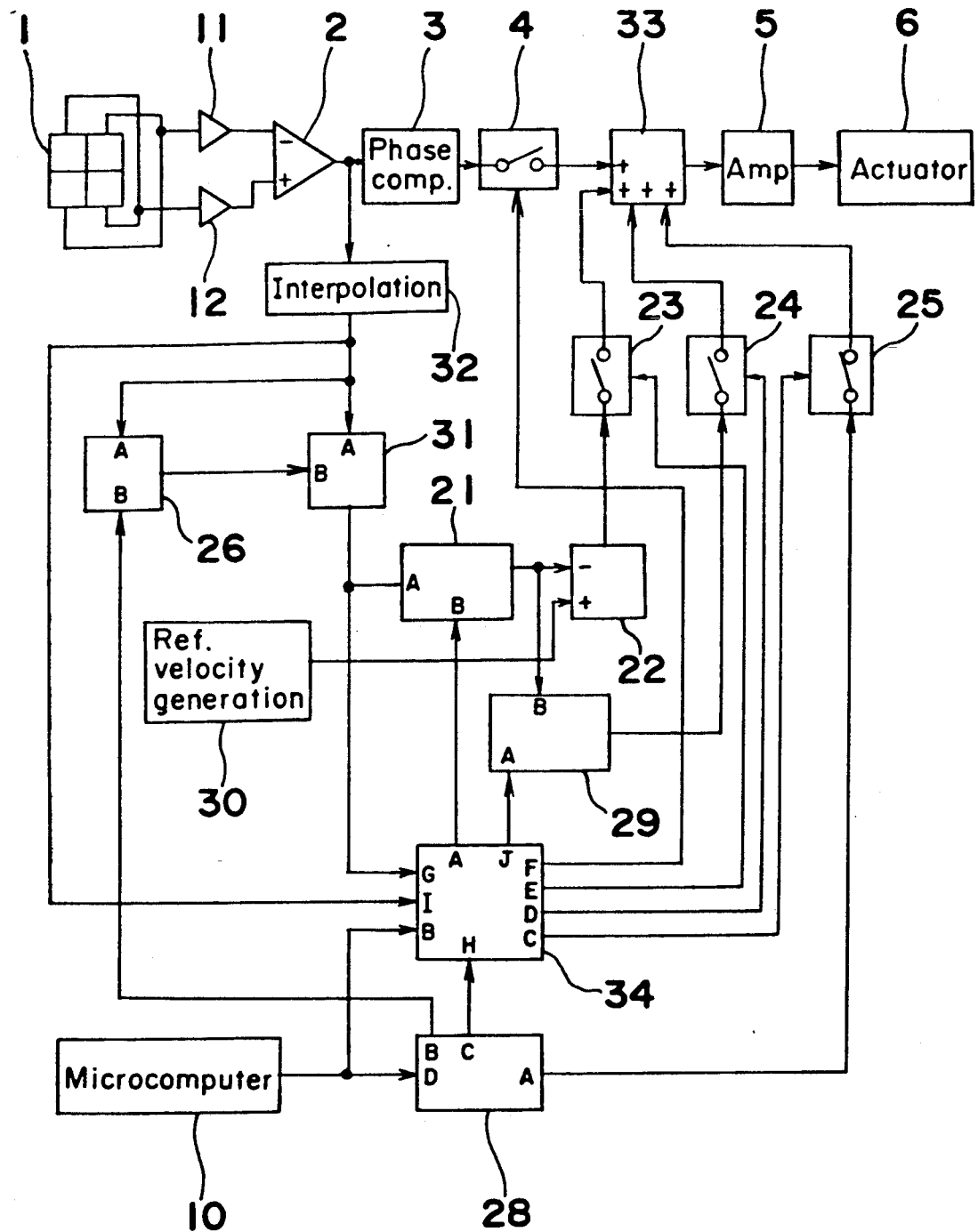
FIG. 5 is a block diagram showing an apparatus according to a second embodiment of the present invention.

Hereinbelow, an apparatus according to the second embodiment of the present invention is described with reference to FIG. 5. The apparatus of FIG. 5 includes an interpolation circuit 32 and a changeover circuit 34. Since other constructions of the apparatus of FIG. 5 are the same as those of the apparatus of FIG. 1, the description thereof is abbreviated for the sake of brevity. The output of the differential amplifier 2 is fed to the interpolation circuit 32. The interpolation circuit 32 usually outputs the inputted FE signal. However, in the case where the FE signal has been affected by an address recorded in advance on the optical disk by grooves, the interpolation circuit 32 outputs a value estimated from a value immediately before the affected FE signal and interpolates the value. The output of the interpolation circuit 32 is applied to the terminal I of the changeover circuit 34, the terminal A of the multiplier 31 and the terminal A of the amplitude detection circuit 26.

When a high-level signal for setting the focusing control into operation is inputted from the microcomputer 10 to the terminal B of the changeover circuit 34, the changeover circuit 34 sets the terminals D, E and F of the changeover circuit 34 to a low level so as to open the switches 24, 23 and 4, and sets the terminal C of the changeover circuit 34 to a high level so as to close the switch 25. Meanwhile, when a high-level signal is inputted to the terminal H of the changeover circuit 34, any one of the terminals D, E and F of the changeover circuit 34 is changed over to a high level in accordance with the FE signal inputted to the terminal I of the changeover circuit 34 or the normalized FE signal inputted to the terminal G of the changeover circuit 34. Meanwhile, when a high-level signal for setting the focusing control into operation is applied to the terminal D of the signal generator 28, the signal generator 28 transmits from its terminal A to the switch 25 a voltage for displacing the, actuator 6.

Figure 6:
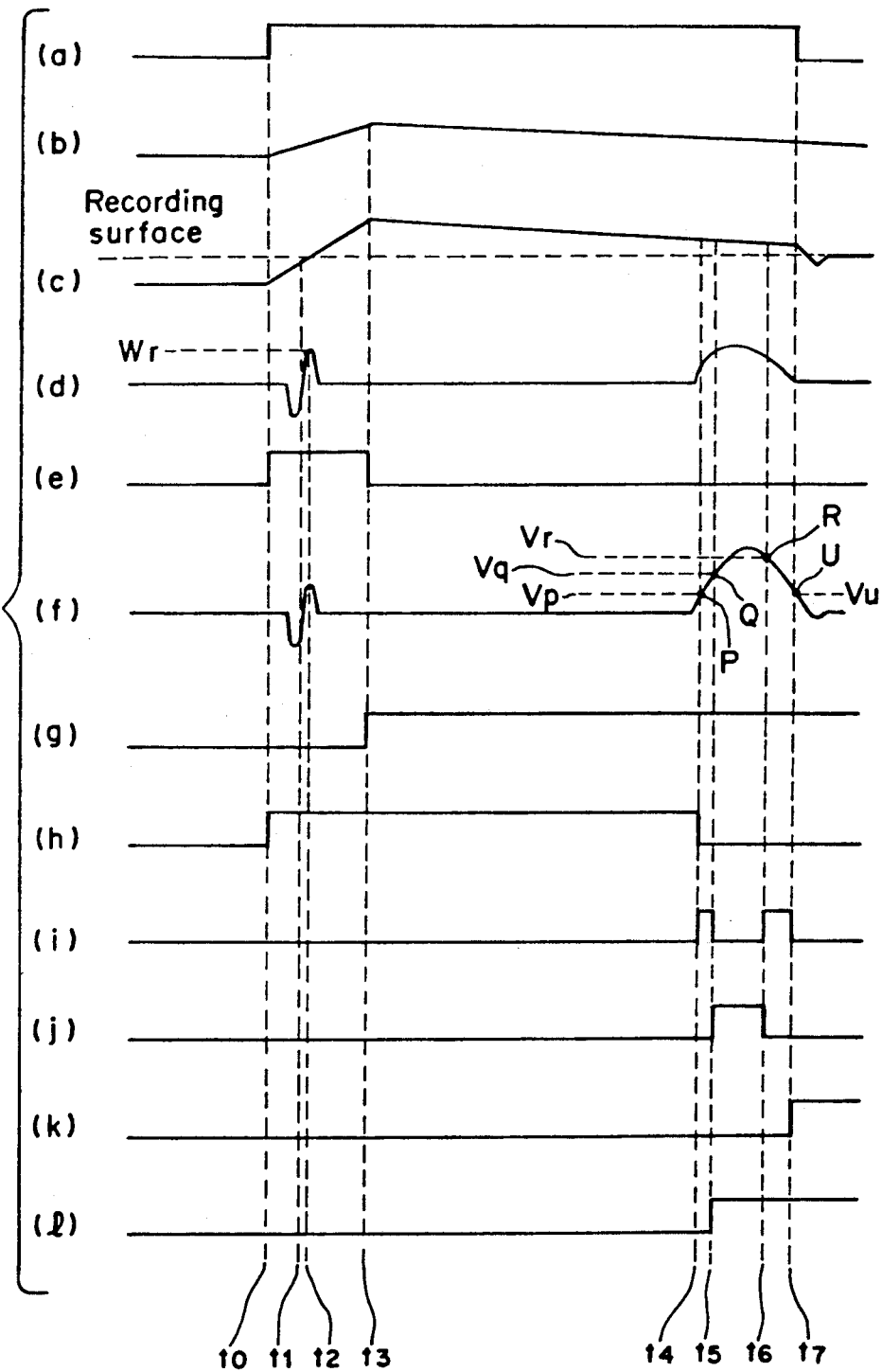
FIGS. 6(a) to 6(l) are timing charts explanatory of the operation of the apparatus of FIG. 5.

Hereinbelow, the operation of the focusing control loop up to its closing is described with reference to the timing charts of FIGS. 6(a) to 6(l). FIG. 6(a) shows a waveform of the output of the microcomputer 10 and FIG. 6(b) shows a waveform of the output of the terminal A of the signal generator 28. FIG. 6(c) shows the focal point location of the beam relative to the recording surface and FIG. 6(d) shows a waveform of the interpolated FE signal. FIG. 6(e) shows waveform of the terminal B of the signal generator 28 and FIG. 6(f) shows a waveform of the output of the multiplier 31. FIG. 6(g) shows a waveform of the output of the terminal C of the signal generator 28 and FIG. 6(h) shows a waveform of the output of the terminal C of the changeover circuit 34. Meanwhile, FIG. 6(i) shows a waveform of the output of the terminal E of the changeover circuit 34 and FIG. 6(j) shows a waveform of the output of the terminal D of the changeover circuit 34. FIG. 6(k) shows a waveform of the output of the terminal F of the changeover circuit 34 and FIG. 6(l) shows a waveform of the output of the terminal A of the changeover circuit 34. It is assumed here that during the interval shown in FIGS. 6(a) to 6(l), the FE signal is not affected by the address recorded on the optical disk by grooves and thus, the FE signal is identical to interpolated FE signal. Since operation up to time t7 is similar to that of the first embodiment of FIGS. 2(a) to 2(l) description thereof is abbreviated for the sake of brevity. When the FE signal assumes a value Vu at a point U at time t7 as shown in FIG. 6(f), the changeover circuit 34 opens that switch 23 and closes the switch 4 as shown in FIGS. 6(i) and 6(k), respectively, such that the focusing control is in operation.

By closing the focusing control loop at time t7 of FIG. 6(f) just before the focal point coincides with the recording surface, overshoot of the focal point relative to the recording surface can be restricted as compared with a case in which the focusing control loop is closed at the time of coincidence of the focal point with the recording surface, so that the transient response is further improved as will be described in detail later.

Figure 7:
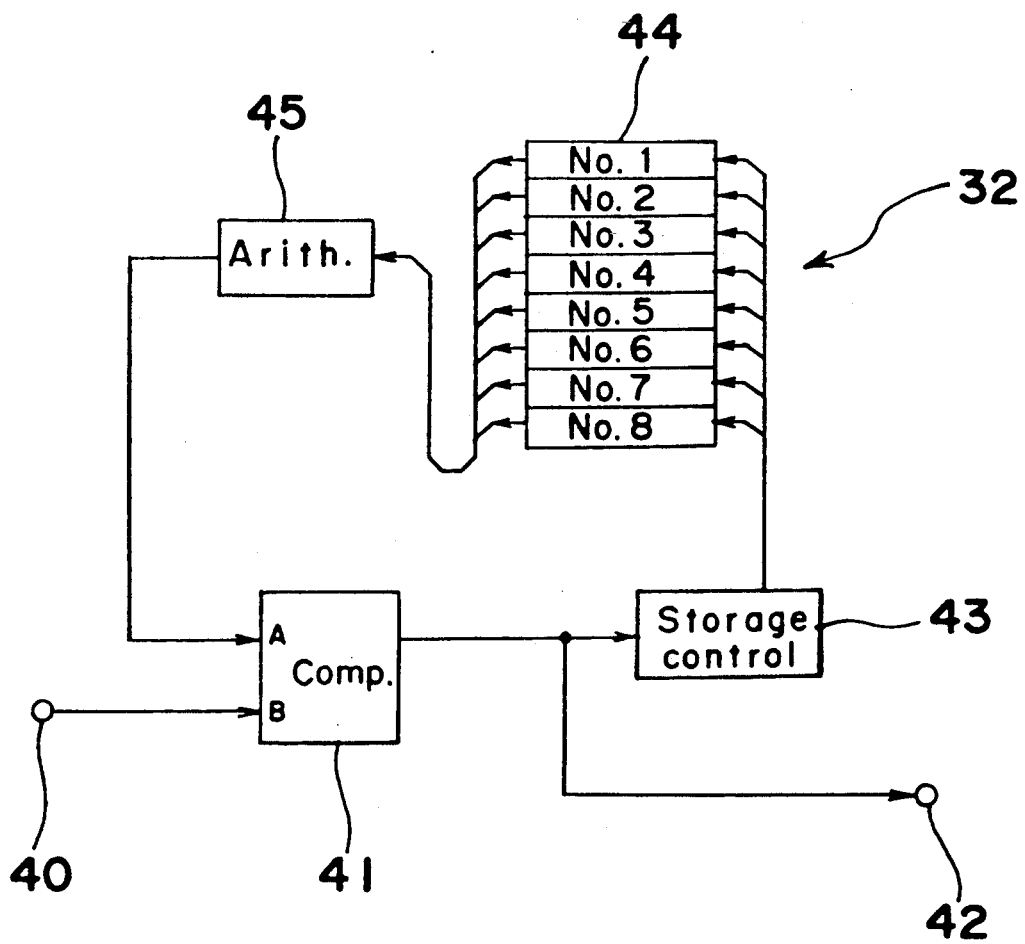
FIG. 7 is a block diagram of an interpolation circuit employed in the apparatus of FIG. 5.

Hereinbelow, the operation of the interpolation circuit 32 is described in detail with reference to FIG. 7.

The FE signal is fed to an input terminal 40. In a comparator 41, when a value of a terminal A falls out of a range of 80-120% of a value of a terminal B, the value of the terminal A is outputted to an output terminal 42 and a storage control circuit 43. On the contrary, when the value of the terminal A falls within the range of 80-120% of the value of the terminal B, the value of the terminal B is applied to the output terminal 42 and the storage control circuit 43. Meanwhile, comparison in the comparator 41 is performed at a predetermined period. When a signal is fed from the comparator 41 to the storage control circuit 43, the storage control circuit 43 transfers values of addresses Nos. 2-8 to addresses Nos. 1-7, respectively in a random access memory (RAM) 44 and stores the output of the comparator 41 in address No. 8. An arithmetic circuit 45 performs arithmetic operations based on the values of addresses Nos. 1-8 of the RAM 44 and transmits the arithmetic result to the terminal A of the comparator 41.

Figure 8:
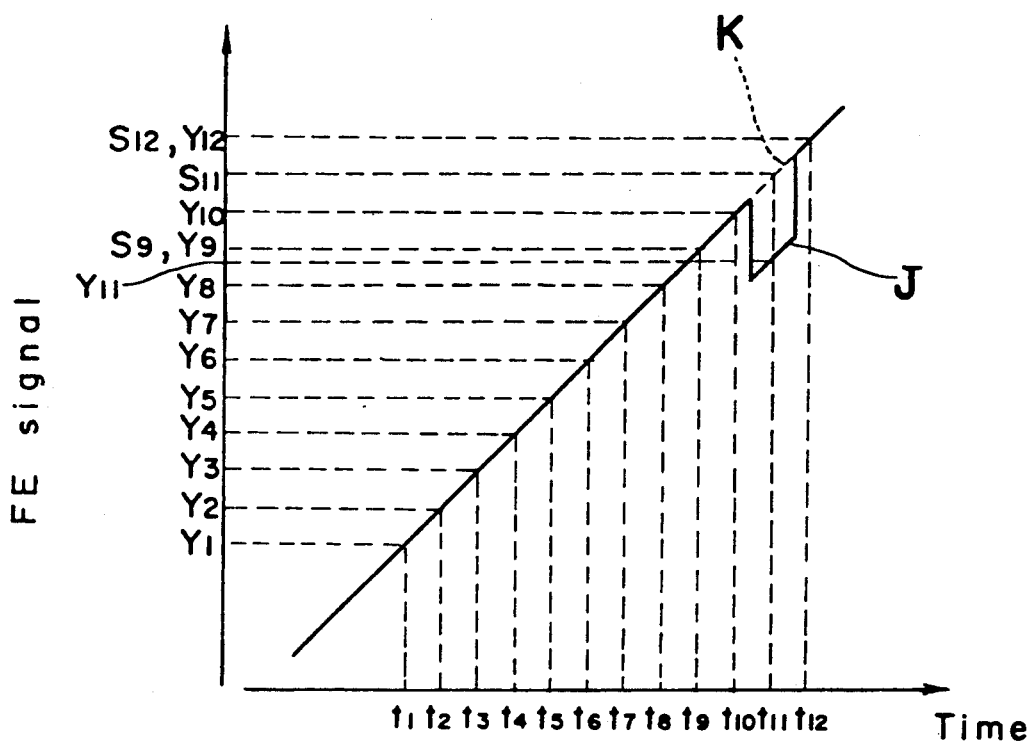
FIG. 8 is a wave-form chart explanatory of the operation of the interpolation circuit of FIG. 7.

Supposing that the FE signal is affected as shown in FIG. 8 by the address recorded on the optical disk by grooves and is inputted to the interpolation circuit 32, the interpolation circuit 32 operates as follows. In FIG. 8, a portion J illustrates the influence of the address recorded on the optical disk by grooves. A portion K formed by a broken straight line represents the value of the FE signal in the case where the FE signal is not affected by the address recorded on the optical disk by grooves. Meanwhile, it is assumed that value of the portion J of the FE signal falls out of a range of 80-120% of value of the portion K of the FE signal. Initially, the arithmetic operation of the arithmetic circuit 45 is described. It is assumed here that values Y1 to Y8 at times t1 to t8 are, respectively, stored in addresses Nos. 1-8 of the RAM 44. The arithmetic circuit 45 approximates the relation between the time from t1 to t8 and the values Y1 to Y8 of the FE signal to a straight line by use of the least squares method and estimates a value S9 of the FE signal at time t9 from the obtained straight line. Supposing that characters Y9 to Y12 denote actual values of the FE signal at times t9 to t12, respectively, while characters S10 to S12 denote estimated values of the FE signal at times t10 to t12, respectively, the comparator 41 compares the actual value Y9 with the estimated value S9. Since the actual value Y9 is not affected by the address recorded on the optical disk by grooves, the actual value Y9 substantially coincides with the estimated value S9 and thus, falls within a range of 80-120% of the estimated value S9. Therefore, the comparator 41 outputs the actual value Y9.

Since prior to time t10, the FE signal is not affected by the address recorded on the optical disk by grooves as shown in FIG. 8, the actual values Y3 to Y10 of the FE signal at times t3 to t10 are, respectively, stored in addresses Nos. 1-8 of the RAM 44 at time t10. At this time, the arithmetic circuit 45 outputs the estimated value S11. When the actual value Y11 affected by the address is fed to the comparator 41, the comparator 41 compares the estimated value S11 with the actual value Y11. Since the actual value Y11 affected by the address falls out of a range of 80-120% of the estimated value S11, the comparator 41 outputs the estimated value S11. Therefore, at time t11, the actual values Y4 to Y10 of the FE signal at times t4 to 10 and the estimated value S11 are, respectively, stored in addresses Nos. 1-8 of the RAM 44, while the estimated value S11 is outputted from the output terminal 42. At this time, the arithmetic circuit 45 outputs the estimated value S12. When the actual value Y12 not affected by the address is inputted to the comparator 41, the comparator 41 compares the estimated value S12 with the actual value Y12. Since the actual value Y12 not affected by the address falls within a range of 80–120% of the estimated value S12, the comparator 41 outputs the actual value Y12. As described above, the influence of an address is eliminated and thus, the value substantially coincident with that of the portion K obtained in the case where the FE signal is not affected by the address is outputted.

By interpolating the FE signal as described above, it becomes possible to eliminate detection errors of the relative velocity or detection errors of the changeover position due to delay or attenuation of amplitude caused in the case where influence of the address is obviated by using a low-pass filter.

In the above described second embodiment, the values at the previous eight points are stored in the RAM 44 and the straight line is obtained from these values so as to estimate the next FE signal. When the actual value falls out of the range of 80–120% of the estimated value, the FE signal is deemed affected by the address. However, it may be possible to change the number of the values to be stored, the approximation function and the judgement criteria in accordance with the magnitude of influence of the address and rate of change of the FE signal. Furthermore, if the FE signal is retrieved at a predetermined period, calculation in the arithmetic circuit 45 can be simplified.

Figure 9:
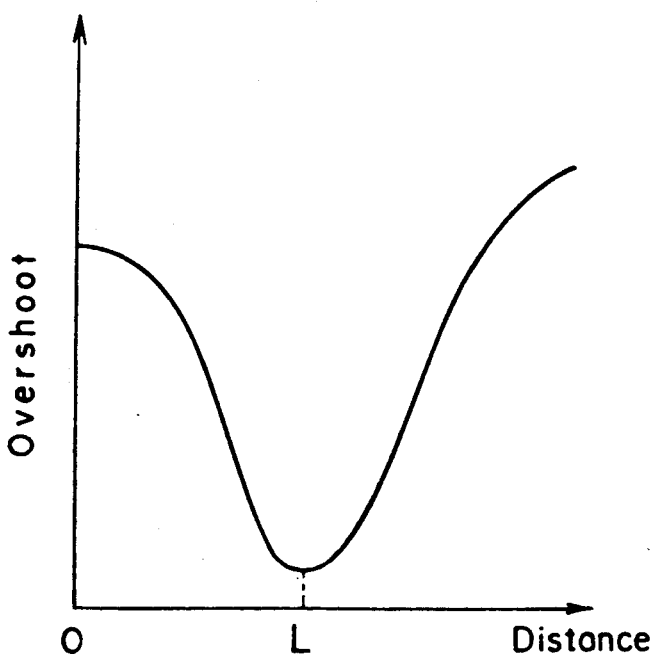
FIG. 9 is a graph showing a relation between an overshoot of the focal point relative to the recording surface and a distance between the focal point and the recording surface in the apparatus of FIG. 5 at the time of closing of a focusing control loop.

By closing the focusing control loop at time t7 of FIG. 6(f) just before the focal point coincides with the recording surface, overshoot of the focal point relative to the recording surface is reduced as compared with a case in which the focusing control loop is closed at the time of coincidence the focal point with the recording surface as shown in FIG. 9. FIG. 9 shows an example of the change of overshoot of the focal point relative to the recording surface in the case where the distance between the focal point and the recording surface is changed at the time of closing of the focusing control loop. In FIG. 9, the relative velocity between the focal point and the recording surface is made constant at the time of closing of the focusing control loop. The overshoot assumes a minimum in the vicinity of a distance L. Therefore, when the value Vu of FIG. 6(f) for closing the focusing control loop is set to a value corresponding to the distance L, the overshoot can be minimized and thus, the transient response can be further improved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method of setting into operation a focusing control for bringing a focal point of a beam onto a recording surface of an optical disk such that the beam reproduces signals from the recording surface, in which a displacement apparatus moves the focal point in a direction perpendicular to the recording surface, said method comprising the steps of:

detecting a gap between the focal point and the recording surface;

determining, based on the thus detected gap, a relative velocity in the perpendicular direction between the focal point and the recording surface, the relative velocity corresponding to a rate of change with respect to time of the detected gap;

controlling a rate of movement of the displacement apparatus on the basis of the thus determined relative velocity; and controlling a position of the displacement apparatus so as to position the focal point close to the recording surface.

2. As apparatus for setting into operation a focusing control for bringing a focal point of abeam onto a recording surface of an optical disk such that the beam reproduces signals from the recording surface, comprising:

a focusing error detection means for detecting a gap between the focal point and the recording surface;

a displacement means for moving the focal point relative to the recording surface in a direction perpendicular to the recording surface;

a focusing control means for controlling a position of said displacement means of the basis of an output of said focusing error detection means so as to bring the focal point onto the recording surface;

a relative velocity detection means for detecting a relative velocity in the perpendicular direction between the focal point and the recording surface from the output of said focusing error detection means, the relative velocity corresponding to a rate of change with respect to time of the detected gap;

a velocity control means for controlling a rate of movement of said displacement means such that an output of said relative velocity direction means becomes a predetermines value; and a changeover means for positioning the focal point close to the recording surface by said velocity control means and for then actuating said focusing control means.

3. An apparatus as claimed in claim 2, wherein said relative velocity detection means employs at least one conversion table for converting the output of said focusing error detection means into a distance between the focal point and the recording surface.

4. An apparatus as claimed in claim 2, wherein said relative velocity detection means employs at least one conversion formula for converting the output of said focusing error detection means into a distance between the focal point and the recording surface.

5. An apparatus as claimed in claim 3, wherein said relative velocity detection means includes two conversion tables and is adapted to change from one conversion table to another conversion table at a distance between the focal point and the recording surface which causes a maximum output of said focusing error detection means.

6. An apparatus as claimed in claim 4, wherein said relative velocity detection means includes two conversion formulas and is adapted to change from one conversion formula to another conversion formula at a distance between the focal point and the recording surface which causes a maximum output of said focusing error detection means.

7. A method of setting into operation a focusing control for bringing a focal point of a beam onto a recording surface of an optical disk such that the beam reproduces signals form the recording surface, in which a focusing error detection device detects a gap between the focal point and the recording surface and a displacement device moves the focal point in a direction perpendicular to the recording surface, said method comprising the steps of:
- causing the displacement device to preliminarily move the focal point so as to obtain a preliminary output of the focusing error detection device;
- converting an output of the focusing error detection device into a relative velocity in the perpendicular direction between the focal point and the recording surface in accordance with an amplitude of the preliminary output of the focusing error detection device, the relative velocity corresponding to a rate of change with respect to time of the detection gap;
- controlling a rate of movement of the displacement device on the basis of the relative velocity; and
- controlling a position of the displacement device so as to bring the focal point onto the recording surface.

8. An apparatus for setting into operation a focusing control for bringing a focal point of a beam onto a recording surface of an optical disk such that the beam reproduces signals from the recording surface, comprising:
- a focusing error detection means for detecting a gap between the focal point and the recording surface;
- an amplification means of amplifying an output of said focusing error detection means;
- a displacement means for moving the focal point relative to the recording surface in a direction perpendicular to the recording surface;
- a correction amount detection means for changing an amplification degree of said amplification means on the basis of an amplitude of the output of said focusing error detection means, which output is obtained at a time when the focal point is moved towards the recording surface from a position spaced from the recording surface by said displacement means so as to overshoot the recording surface;
- a focusing control means for controlling a position of said displacement means so as to bring the focal point onto the recording surface;
- a relative velocity detection means for detecting a relative velocity in the perpendicular direction between the focal point and the recording surface from an output of said amplification means, the relative velocity corresponding to a rate of change with respect to time of the detected gap;
- a velocity control means for controlling a rate of movement of said displacement means such that an output of said relative velocity detection means becomes a predetermined value; and
- a changeover means for positioning the focal point close to the recording surface by said velocity control means and for then actuating said focusing control means.

9. An apparatus for setting into operation a focusing control for bringing a focal point of a beam onto a recording surface of an optical disk such that the beam reproduces signals from the recording surface, comprising:
- a focusing error detection means for detecting a gap between the focal point and the recording surface;
- a displacement means for moving the focal point relative to the recording surface in a direction perpendicular to the recording surface;
- a focusing control means for controlling a position of said displacement means on the basis of an output of said focusing error detection means so as to bring the focal point onto the recording surface;
- a relative velocity detection means for detecting a relative velocity in the perpendicular direction between the focal point and the recording surface from the output of said focusing error detection means, the relative velocity corresponding to a rate of change with respect to time of the detected gap;
- a region detection means for detecting a region in which the output of said focusing error detection means changes relative to a distance between the focal point and the recording surface at a predetermined rate or less;
- a velocity control means for controlling a rate of movement of said displacement means such that an output of said relative velocity detection means becomes a predetermined value and for opening a control loop in response to a signal output from said region detection means; and
- a changeover means for positioning the focal point close to the recording surface by said velocity control means and for then actuating said focusing control means.

10. An apparatus as claimed in claim 8, wherein said focusing control means controls the position of said displacement means on the basis of the output of said focusing error detection means.

11. An apparatus as claimed in claim 8, wherein said focusing control means controls the position of said displacement means on the basis of the output of said amplification means.

12. An apparatus as claimed in claim 9, wherein said region detection means detects the region by determining when the output of said focusing error detection means exceeds a preset value.

13. An apparatus as claimed in claim 9, wherein during an interval of detection of said region detection means, said velocity detection means sets the relative velocity to the predetermined value on the basis of the output of said relative velocity detection means taken immediately before the interval.

14. An apparatus for setting into operation a focusing control for bringing a focal point of a beam onto a recording surface of an optical disk such that the beam reproduces signals from the recording surface, comprising:
- a focusing error detection means for detecting a gap between the focal point and the recording surface;
- a displacement means for moving the focal point relative to the recording surface in a direction perpendicular to the recording surface;
- a focusing control means for controlling a position of said displacement means on the basis of an output of said focusing error detection means so as to bring the focal point onto the recording surface;
- an interpolation means for interpolating, by using an estimation value, the output of said focusing error detection means when the output of said focusing error detection means has been influenced by disturbances;
- a relative velocity detection means for detecting a relative velocity in the perpendicular direction between the focal point and the recording surface from an output of said interpolation means, the relive velocity corresponding to a rate of change with respect to time of the detected gap;
- a velocity control means for controlling a rate of movement of said displacement means such that an output of said relative velocity detection mans becomes a predetermined value; and a changeover means for positioning the focal point close to the recording surface by said velocity control means for then actuating said focusing control means.

15. A method of setting into operation a focusing control for bringing a focal point of a beam onto a recording surface of an optical disk such that the beam reproduces signals from the recording surface, in which a displacement device moves the focal point relative to the recording surface in a direction perpendicular to the recording surface, said method comprising the steps of:

detecting a gap between the focal point and the recording surface;

detecting a relative velocity in the perpendicular direction between the focal point and the recording surface from the detected gap, the relative velocity corresponding to a rate of change with respect to time of the detected gap;

positioning the focal point close to the recording surface by controlling a rate of movement of the displacement means on the basis of the detected relative velocity; and starting focusing control at a time when the detected gap has reached a predetermined value.

16. An apparatus as claimed in claim 14, wherein said interpolation means estimates a next output of said focusing error detection means based on prior outputs of said focusing error detection means, and wherein when the next output falls out of a predetermined range of the estimation value, the estimation value is output in lace of the next output and the estimation value is used for a subsequent estimation.

17. An apparatus as claimed in claim 16, wherein the estimation of said interpolation means is performed at a predetermined period.

18. An apparatus as claimed in claim 16, wherein said interpolation means obtains the estimation value by approximating a functioning denoting a change of the output of said focusing error detection means relative to time.

19. An apparatus as claimed in claim 18, wherein the function is a linear function.

20. An apparatus as claimed in claim 18, wherein said interpolation means uses a least squares method for the approximation.

21. A method as claimed in claim 15, wherein a distance between the focal point and the recording surface, which provides an approximate minimum of an overshoot of the focal point relative to the recording surface when focusing control has been performed, becomes a predetermined value.

* * * * *